3,833,713
METHOD OF MANUFACTURING
SYNTHETIC CRYOLITE
Jacqueline C. Kane, Leonia, N.J., assignor to Stauffer Chemical Company, Westport, Conn.
No Drawing. Continuation of application Ser. No. 124,418, Mar. 15, 1971, which is a continuation-in-part of application Ser. No. 23,516, Mar. 27, 1970, which in turn is a continuation-in-part of abandoned application Ser. No. 687,983, Dec. 5, 1967. This application Jan. 5, 1973, Ser. No. 321,199
Int. Cl. C01b 33/00, 33/12; C01f 7/50
U.S. Cl. 423—465
17 Claims

ABSTRACT OF THE DISCLOSURE

A process for recovering fluorine values from effluent gases and converting them to cryolite which involves the steps of reacting said gas with ammonium derivatives to produce ammonium fluoride. Then the ammonium fluoride is reacted with clay which is an aluminosilicate composition containing clay forming minerals such as kaolinite, halloysite, montmorillonite, illite and mixtures thereof. Optionally, the ammonium cryolite thus produced can be reacted with sodium hydroxide to produce sodium cryolite.

CROSS-REFERENCE TO RELATED APPLICATION

This application is a continuation of my pending application Ser. No. 124,418, filed Mar. 15, 1971, now abandoned is a continuation-in-part of my pending application Ser. No. 23,516, filed Mar. 27, 1970 which is a continuation-in-part of my application Serial No. 687,983, filed Dec. 5, 1967, now abandoned.

BACKGROUND OF THE INVENTION

When a strong mineral acid such as sulfuric acid, phosphoric acid, or nitric acid is applied to a phosphate substance containing fluorine, for example, in the production of phosphoric acid or phosphate fertilizers such as superphosphate or triple superphosphate by the so-called wet process, troublesome and noxious fluorine containing compounds such as silicon tetrafluoride, $SiF_4$, fluosilicic acid, $H_2SiF_6$, hydrofluoric acid, HF, or the like are formed and liberated. A similar liberation of gases results during production of defluorinated phosphate rock or when glass is etched with hydrofluoric acid.

The volatile fluorine compounds thus formed are extremely toxic in character and to comply with good public relations and to abate what would be an intolerable air pollution nuisance, the volatile fluorine compounds must be removed from the exhaust air stream before being discharged to the atmosphere. This removal must be almost quantitative in character; for example, it has been found that air containing less than 0.1 part per million by volume of water soluble fluorine compounds (calculated as hydrofluoric acid) is toxic to conifers.

Any process involving the absorption in water of the water soluble fluorine compounds present in the effluent gas stream produces fluosilicic acid and by-product silica hydrate. Existing legal restrictions forbid the direct discharge to the sewer of the raw acid. For example, effluent discharged to the Los Angeles County Sanitary Sewage System must be neutralized to a minimum pH of 6; i.e., all acids present must be neutralized quantitatively. This is obviously a matter of substantial expense.

Another method of disposing of the waste fluosilicic acid now in use involves addition of the effluent liquor from the scrubber either directly to the phosphate rock prior to discharge of the reaction slurry thus formed to the den, or to the phosphate rock in the den immediately after acidification of the rock with sulfuric acid. This method has several undesirable features; if the phosphate rock charge to the den is the so-called "white rock," the super-phosphate den product is soupy in character, and requires excessive setup time to meet customer specifications if fluosilicic acid is added to the rock. The highly corrosive, abrasive character of the reaction mixture of normal rock and fluosilicic acid causes excessive material handling equipment failure. Finally, the fluorine content of the superphosphate den product is increased by the addition of the fluosilicic acid to the phosphate rock.

It is believed obvious from the above that the fluorine content of the phosphate rock utilized in the manufacture of phosphate fertilizers and phosphoric acid represents a problem of some magnitude because of the nature of the products involved. A further difficulty is in the relatively large volume of fluorine evolved, essentially as gaseous silicon tetrafluoride, for example, each ton of Western phosphate rock contains from sixty to seventy pounds of fluorine. From 40% to 60% of this is released, essentially as gaseous silicon tetrafluoride. When it is remembered that plants acidulating 500 to 1,500 tons of phosphate rock a day are not uncommon, the size aspect of the problem will be further apparent. An economically attractive solution is needed.

In view of the magnitude of the waste fluoride problem many schemes have been devised to make useful products from the fluorine values in gaseous streams or to at least convert them to some less noxious or more controllable form. United States Patent 2,945,745 discloses a method for preparing ammonium fluosilicate by absorbing silicon tetrafluoride in water and treating the solution with ammonia. United States Patent 3,024,086 discloses a process whereby the fluorine values are scrubbed from a gaseous stream with an aqueous ammoniacal solution containing ammonium fluoride and ammonium fluosilicate, precipitating the silica from the ammonium fluosilicate to form silica and ammonium fluoride and reacting the ammonium fluoride with lime to form calcium fluoride and ammonia which is recycled to the absorption system.

Other schemes have been devised to make cryolite, aluminum fluoride, or ammonium cryolite from ammonium fluoride which is recovered from gaseous fluoride containing streams. United States Patent 2,981,597 discloses a process in which ammonium fluoride is reacted with a soluble aluminum salt ($Al_2[SO4]_3$) and U.S. Pat. 2,916,352 discloses a process wherein ammonium fluoride is reacted with aluminum fluoride to produce ammonium cryolite which is converted to sodium cryolite. British Patent 635,553 discloses a process for preparing aluminum fluoride by reacting aluminum ammonium fluoride and aluminum oxide the aluminum ammonium fluoride can be prepared by reacting aluminum oxide and ammonium fluoride. Netherland Patent 6,607,295 discloses a process for preparing aluminum fluoride by reacting aluminum oxide or hydrate with ammonium fluoride. All the processes which form useful aluminum containing fluorine compounds are characterized in that they require a relatively pure source of aluminum for the process (soluble aluminum salts, aluminum oxide, aluminum hydrate). As a result of the need for a relatively pure source of aluminum for known processes, the high cost of the aluminum source often dictates against utilization of the known processes for recovery of fluorine values from gaseous effluent streams.

United States Patents 1,859,998 and 1,911,004 disclose processes for recovering silica or silicon-fluorine compounds by reacting a silaceous oxygen containing composition with ammonium fluoride and heating the reaction mixture to drive off the volatile silicon-fluorine compounds. The process converts the silicon to volatile silicon compounds and the other metallic components to the fluorides and oxides. Only enough ammonium fluoride is reacted with the silaceous oxygen containing compositions to form the volatile silicon fluoride and metallic fluorine compounds or metallic oxides. These processes are characterized by their use of relatively inexpensive sources of silicon but they require expensive high temperature equipment with high utility costs to separate the volatile silicon-fluorine compounds and to recover the fluorine values from the reaction mixture.

It is an object of the present invention to provide a process for recovery of fluorine values from gaseous effluent streams containing inorganic fluorine compounds. It is a further object of the present invention to provide a process for recovering fluorine values from gaseous effluent streams from phosphate plants. It is an object of the present invention to provide a process for preparing aluminum fluorine compounds utilizing an inexpensive source of aluminum. It is also an object of the present invention to provide a process for preparing ammonium cryolite ([NH$_4$]$_3$AlF$_6$) and cryolite (Na$_3$AlF$_6$) from an impure and inexpensive source of aluminum. It is a further object of the present invention to provide a process for preparing ammonium cryolite and cryolite by the use of clay as the source of the aluminum.

DESCRIPTION OF THE INVENTION

In this invention, fluorine values can be recovered by absorbing the fluorine containing gas in aqueous ammonium fluoride. Subsequent ammoniation produces pigmentary silica and additional ammonium fluoride, which is then reacted with an aluminum containing clay to produce ammonium cryolite, (NH$_4$)$_3$AlF$_6$. This ammonium cryolite is then reacted with sodium hydroxide to produce sodium cryolite. The clays that are usable with the present invention are aluminum silicate compositions containing clay minerals such as kaolinite, halloysite, montmorillonite, illite and mixtures thereof.

DETAILED DESCRIPTION OF THE INVENTION

In the practice of the present invention, silicon tetrafluoride gas produced during the acidulation of phosphate rock for the manufacture of wet process phosphoric acid is recovered by contacting the silicon tetrafluoride gas with an aqueous solution of ammonium fluoride. Suitable methods for preparing ammonium fluoride are disclosed in U.S. Pats. 2,981,597 and 3,024,086. The silicon tetrafluoride gas is merely contacted with the aqueous solution or scrubbed with the solution at conventional temperatures until the silicon tetrafluoride has reacted with the ammonium fluoride to form a solution containing ammonium silicofluoride, (NH$_4$)$_2$SiF$_6$. The reaction is thought to proceed according to the following equation:

$$SiF_4 + 2NH_4F \rightarrow (NH_4)_2SiF_6.$$

Other volatile fluorine compounds such as HF in the gaseous stream are reacted with the silicon tetrafluoride, ammonia, and water to form ammonium fluoride or ammonium silicofluoride.

In a continuous operation a portion of the absorption solution is directed to a silica precipitation zone. Ammonia is then introduced into the aqueous solution of ammonia silicofluoride in the silica precipitation zone until the pH of the solution is at least above 7 and preferably above 9. During the addition of the ammonia, the solution should be kept hot preferably between about 70° C. and 110° C., and most preferably around 90° C. The ammonia will react with the ammonia silicofluoride to form ammonium fluoride (NH$_4$F) and solid silicon dioxide, which precipitates. The silicon dioxide can be recovered by ordinary separation means such as by simple filtration, decantation, or other suitable solid liquid separation means. The reaction is thought to proceed according to the equation:

$$(NH_4)_2SiF_6 + 4NH_3 + 4H_2O \rightarrow 6NH_4F + Si(OH)_4$$

A portion of the ammonium fluoride containing solution formed in this latter reaction can be recycled to absorb additional silicon tetrafluoride. The remainder is contacted with an aluminum containing clay. The aluminum containing clay is slurried in the aqueous ammonium fluoride containing solution. The reaction proceeds above about 40° C. but to insure rapid reaction the mixture of ammonium fluoride solution and clay is usually reacted at between about 80° C. and 115° C. and preferably at about reflux temperature. The reaction time depends primarily on the temperature of the reaction mixture, the excess of solution, and the particle size of the clay. The higher temperatures provide shorter reaction times.

Although the mesh size of the clay employed is not critical, the mesh size should be small enough to provide intimate contact with the ammonium fluoride solution to provide a reaction there between in a reasonable length of time and should preferably be smaller than about 30 mesh as measured by U.S. Sieve Series.

The aluminum silicate composition in the clay reacts with the ammonium fluoride to provide a soluble ammonium silicofluoride and a relatively insoluble ammonium cryolite which precipitates from the solution. The reaction is thought to proceed according to the following reaction scheme which for illustrative purposes will utilize the mineral form kaolinite which is common in clay.

$$(Al_2O_3.2SiO_2.2H_2O) + 24NH_4F \rightarrow 2(NH_4)_2SiF_6 + 2(NH_4)_3AlF_6 + 9H_2O + 14NH_3.$$

The ammonia formed in the reaction is driven from the reaction mixture at the temperature of the reaction and can be returned to the silica precipitation step or the absorption step of the process.

The ammonium silicofluoride remains in solution and can be separated from the precipitated ammonium cryolite by conventional solid liquid separation means such as centrifuges, filters, decantation and the like.

To obtain a product which contains only small amounts of impurities it is desirable to provide at least the stoichiometric amount of ammonium fluoride to react with the components in the clay and to form ammonium silicofluoride and ammonium cryolite. In this regard, it should be noted that it is preferred to employ an excess of ammonium fluoride in the reaction mixture and most preferably an excess of between about 15 and about 60% by weight of ammonium fluoride above that stoichiometrically required to react with the components in the clay and to form ammonium silicofluoride and ammonium cryolite. A small excess of ammonium fluoride provides for shorter reaction times and a more pure product.

The solution containing ammonium silicofluoride separated from the ammonium cryolite can be recycled back to the absorption or silica precipitation step to recover the silica and fluorine values contained therein.

To form cryolite [Na$_3$AlF$_6$] the ammonium cryolite can be slurried with an appropriate amount of an aqueous sodium hydroxide solution and reacted. The reaction is usually, but not necessarily conducted at about reflux temperature until sodium cryolite is formed. The sodium cryolite can be recovered by simple filtration. The ammonia liberated during the reaction is released from the hot reaction mixture and can be recycled back to the absorption or silica precipitation step. The reaction of sodium hydroxide with ammonium cryolite to form cryolite is well known and proceeds according to the equation $$(NH_4)_3AlF_6 + 3Na(OH) \rightarrow Na_3AlF_6 + 3NH_3 + 3H_2O.$$

Other sodium salts can be utilized to replace the ammonia by a simple metathesis.

As used herein clay denoted an aluminum containing composition which contains a substantial amount of at least one of the clay forming minerals such as kaolinite, halloysite, montmorillonite, illite and the like. Since clay is a natural material it usually contains the clay forming minerals in varying proportions along with impurities such as quartz, muscovite and the like. It is desirable though not necessary in the process of the present invention to utilize clays containing as high a proportion of aluminum as possible, since the recycling of reactants and handling of materials can be minimized. The aluminum containing clays constitute a cheap raw material for the manufacture of ammonium cryolite and sodium cryolite which finds wide use as an electrolyte in the production and refining of aluminum from its oxide, in ceramic manufacturing, in pesticides, as binders for abrasives, in electrical insulation, as a flux in the open hearth process, and in explosives and polishes.

While this invention has been described with particular emphasis on the recovery of silicon tetrafluoride liberated in the wet process for manufacturing phosphoric acid it is to be understood that the principals of this invention are not limited thereto but can be utilized to recover HF and other inorganic fluorine compounds which can be absorbed and reacted to form ammonium fluoride.

The following examples illustrate the merits of the invention.

Example 1

Anhydrous ammonia was bubbled into a solution of 225 grams ammonium silicofluoride [$(NH_4)_2SiF_6$] dissolved in 1500 grams of water (pH=3.5) at 90° C. The pH was monitored and the addition of ammonia was discontinued when the pH reached 9.4. Silica precipitated and was removed by filtration from the ammonium fluoride solution. The silica was dried and weighed 73.5 grams ($SiO_2$). A yield of 96.9% based on silicon was obtained.

Example 2

A hydrated aluminum silicate, kaolinite clay, of −325 mesh size was obtained which had the following average composition.

| | Percent |
|---|---|
| Silicon dioxide | 45.3 |
| Aluminum oxide | 38.4 |
| Iron oxide | 0.3 |
| Titanium dioxide | 1.4 |
| Calcium oxide | 0.05 |
| Potassium oxide | 0.04 |
| Magnesium oxide | 0.25 |
| L.O.I. | 14.0 |

Fifty-eight grams of the above kaolinite clay was admixed with 541 grams aqueous ammonium fluoride solution containing 241 grams of $NH_4F$ (about 20% excess) and heated with stirring at reflux, 100 to 105° C., for one hour. The mixture was filtered hot. The solid was dried at 20–30° C. and found to weight 88.9 grams which represents a 98.7% yield of ammonium cryolite based on the aluminum in the clay.

Example 3

Fifty grams of the ammonium cryolite prepared in Example 2 was slurried in a caustic solution consisting of 31 grams NaOH dissolved in 100 ml. water. The mixture was heated with stirring to reflux (98° C.) and held there for five hours. Sodium cryolite was separated by filtration and oven dried. There was recovered 50.7 grams of a product having the following composition:

| | Percent |
|---|---|
| F | 49.1 |
| Na | 30.1 |
| Al | 12.4 |
| $SiO_2$ | 0.46 |
| $Fe_2O_3$ | 0.10 |
| $H_2O$ | 2.26 |

There was recovered 94.7% of the aluminum present in the clay as sodium cryolite.

As can be seen the process of the present invention can provide high yields of a high quality cryolite from clay as the source of the aluminum.

Examples 4 and 5 illustrate the effect of utilization of stoichiometric amounts of ammonium fluoride on the reaction time and yield of the process.

Example 4

To 58 grams of the clay described in Example 2 was added the stoichiometric amount of $NH_4F$ (200 g.) dissolved in 300 ml. water. The resulting mixture was heated with stirring at reflux, 100–105° C., for one hour. The mixture was filtered hot. The filter cake was air dried at room temperature and represented an 88.0% yield of product based on aluminum contained in the clay.

Example 5

The procedure described in Example 4 was repeated except that the mixture was held at reflux, 100–105° C., for 5 hours. In this case the yield of ammonium cryolite based on the aluminum content of the clay was 92.2%.

What is claimed is:

1. In a process for recovering fluorine values from gas streams, wherein ammonium fluoride solution is produced from said fluorine values and said ammonium fluoride solution is reacted with an aluminum containing material to produce ammonium cryolite, the improvement comprising reacting a clay consisting essentially of aluminum silicate as said aluminum containing material with the ammonium fluoride solution provided in an amount at least stoichiometrically necessary to react with the components in the clay and to form solid ammonium cryolite and a solution containing ammonium silicofluoride from the aluminum and silicon in the clay at a temperature between 80° C. and about reflux, and separating the ammonium cryolite from the ammonium silicofluoride solution.

2. The process for preparing ammonium cryolite which comprises:
  (a) providing an ammonium fluoride solution;
  (b) reacting at a temperature from about 80° C. to reflux temperature clay consisting essentially of aluminum silicate containing mineral selected from the group consisting of kaolinite, halloysite, montmorillonite, illite and mixtures thereof with the ammonium fluoride solution provided in an amount in excess of that stoichiometrically necessary to react with the components in the clay and to form solid ammonium cryolite and a solution containing ammonium silicofluoride from the aluminum and silicon in the clay;
  (c) separating the ammonium cryolite from the hot ammonium silicofluoride solution.

3. The process as set forth in claim 1 wherein said clay contains clay minerals selected from the group consisting of kaolinite, halloysite, montmorillonite, illite and mixtures thereof.

4. The process as set forth in claim 1 wherein said clay is finely divided and is of a size smaller than 30 mesh.

5. The process as set forth in claim 1 wherein said gas stream contains silicon tetrafluoride, fluosilicic acid, hydrogen fluoride or mixtures thereof.

6. The process as set forth in claim 1 wherein said ammonium fluoride solution is formed by reacting said fluorine values in said gas stream with ammonium fluoride solution to produce ammonium silicofluoride solution; thereafter, said ammonium silicofluoride solution is reacted with ammonia to produce solid hydrated silica and ammonium fluoride solution.

7. The process as set forth in claim 6 wherein the hydrated silica is separated from the ammonium fluoride solution by filtration.

8. The process as set forth in claim 1 together with the additional step of reacting said ammonium cryolite with sodium hydroxide to produce sodium cryolite.

9. The process as set forth in claim 6 wherein said ammonium silicofluoride is reacted with ammonia until the pH of said resultant solution is above 7, and the temperature of said reaction is maintained between 70 and 110° C.

10. The process as set forth in claim 1 wherein an excess of between 15 and 60% by weight of ammonium fluoride is employed with the aluminum containing clay.

11. The process of claim 1 for recovering fluorine values from a gas stream which comprises:
 (a) contacting the fluorine containing gas stream with a solution containing ammonium fluoride to absorb fluorine values from the gas stream and form a solution containing ammonium silicofluoride;
 (b) adding ammonia to said solution containing ammonium silicofluoride to precipitate hydrated silica and provide a solution containing ammonium fluoride;
 (c) reacting the clay with the solution containing ammonium fluoride, said solution provided in an amount sufficient to provide a stoichiometric excess of ammonium fluoride to react with the components of the clay and to react the silica to ammonium silicofluoride and the aluminum to ammonium cryolite to produce a solution containing ammonium silicofluoride and precipitate ammonium cryolite;
 (d) separating the precipitated ammonium cryolite from the solution containing ammonium silicofluoride.

12. The process of claim 11 wherein the solution containing ammonium silicofluoride is maintained at a temperature of from about 70° C. to about 110° C. during the addition of ammonia to raise the pH above about 7 to precipitate the hydrated silica.

13. The process of claim 11 wherein the solution containing ammonium fluoride is provided in an amount which is sufficient to provide from about a 15% to about a 60% stoichiometric excess by weight of ammonium fluoride necessary to react with the components in the clay and to react the silica to ammonium silicofluoride and the aluminum to ammonium cryolite.

14. The process of claim 11 wherein the fluorine values comprise silicon tetrafluoride, fluosilicic acid, hydrogen fluoride or mixtures thereof.

15. The process of claim 11 for recovering fluorine values from a gas stream comprising silicon tetrafluoride, fluosilicic acid or mixtures thereof comprising:
 (a) contacting the fluorine containing gas stream with an ammonium fluoride solution to form an ammonium silicofluoride solution;
 (b) adding ammonia to the ammonium silicofluoride solution maintained at a temperature of from about 70° C. to about 110° C. to raise the pH of the ammonium silicofluoride solution above 7 to precipitate hydrated silica and form an ammonium fluoride solution;
 (c) reacting an aluminum containing clay with the ammonium fluoride solution at a temperature between about 80° C. and about 115° C. to form ammonium cryolite and ammonium silicofluoride, the ammonium fluoride solution is provided in excess of the stoichiometric amount necessary to react with the components of the clay and to form a solution containing ammonium silicofluoride and precipitate ammonium cryolite;
 (d) separating the ammonium cryolite from the hot ammonium silicofluoride solution.

16. The process of claim 15 wherein the ammonium silicofluoride solution of step (d) is admixed with the ammonium silicofluoride solution of step (a).

17. The process of claim 15 wherein the reaction temperature is between 80° C. and 115° C.

References Cited

UNITED STATES PATENTS

| | | | |
|---|---|---|---|
| 1,426,890 | 8/1922 | McClenahan | 423—341 X |
| 1,859,998 | 5/1932 | Svendsen | 423—336 |
| 1,911,004 | 5/1933 | Svendsen | 423—343 |
| 2,916,352 | 12/1959 | Fitch et al. | 423—116 |
| 2,981,597 | 4/1961 | Tarbutten et al. | 423—465 |
| 2,945,745 | 7/1960 | Reeve | 423—326 |
| 3,024,086 | 3/1962 | Cines | 423—240 |
| 3,089,752 | 5/1963 | Clark | 423—472 |

EDWARD STERN, Primary Examiner

U.S. Cl. X.R.

433—341